July 25, 1961  F. M. DEMER ET AL  2,993,437
HIGH SPEED PRINTER APPARATUS
Filed Oct. 5, 1959  9 Sheets-Sheet 2

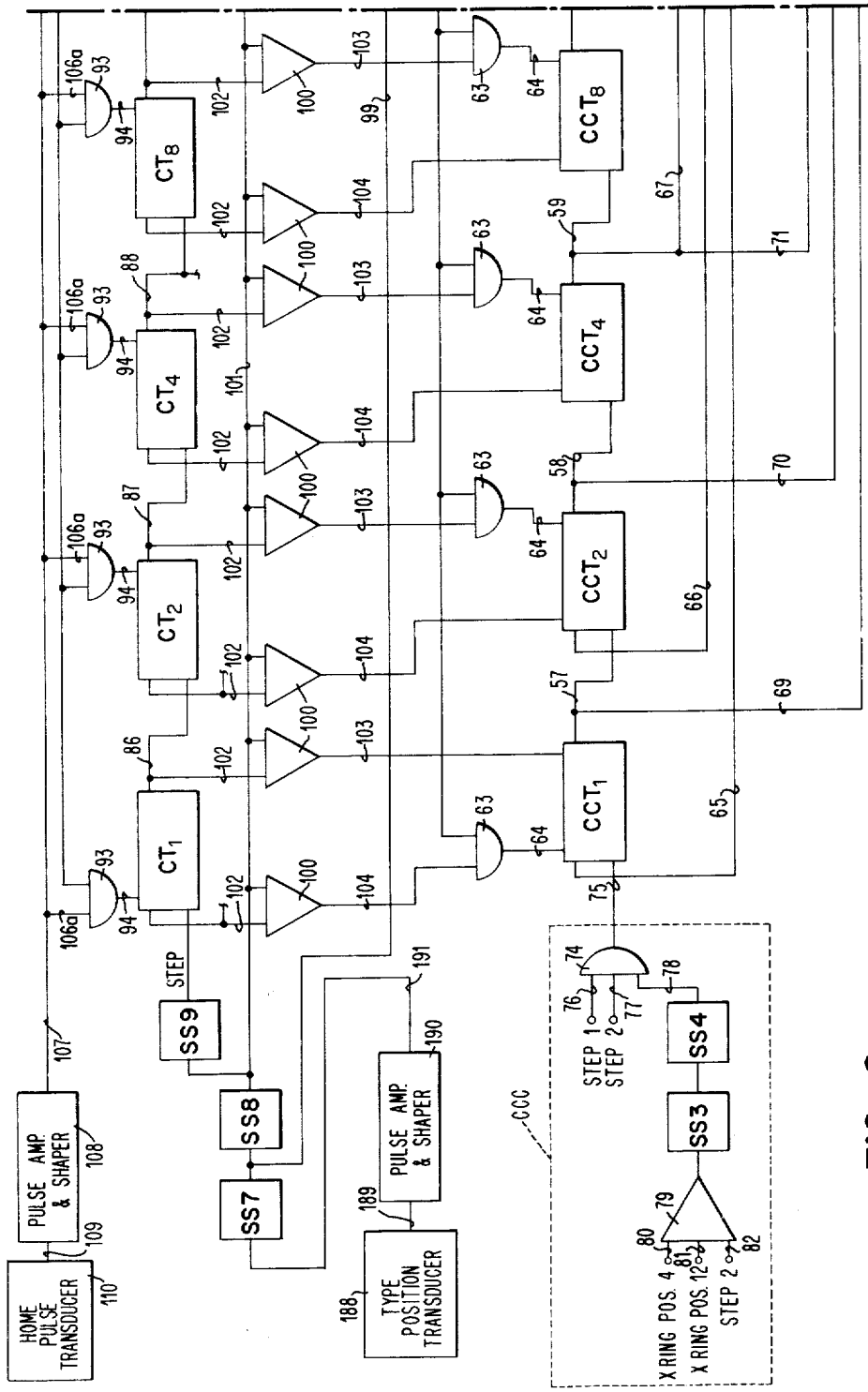

| Type Position Number | Character | 1 | 2 | 4 | 8 | B | A |
|---|---|---|---|---|---|---|---|
| 1 | A | X | O | O | O | X | X |
| 2 | B | O | X | O | O | X | X |
| 3 | C | X | X | O | O | X | X |
| 4 | D | O | O | X | O | X | X |
| 5 | E | X | O | X | O | X | X |
| 6 | F | O | X | X | O | X | X |
| 7 | G | X | X | X | O | X | X |
| 8 | H | O | O | O | X | X | X |
| 9 | I | X | O | O | X | X | X |
| 10 | — | O | X | O | X | X | X |
| 11 | . | X | X | O | X | X | X |
| 12 | ✧ | O | O | X | X | X | X |
| 13 | 1 | X | O | O | O | O | O |
| 14 | 2 | O | X | O | O | O | O |
| 15 | 3 | X | X | O | O | O | O |
| 16 | 4 | O | O | X | O | O | O |
| 17 | 5 | X | O | X | O | O | O |
| 18 | 6 | O | X | X | O | O | O |
| 19 | 7 | X | X | X | O | O | O |
| 20 | 8 | O | O | O | X | O | O |
| 21 | 9 | X | O | O | X | O | O |
| 22 | ZERO | O | X | O | X | O | O |
| 23 | # | X | X | O | X | O | O |
| 24 | @ | O | O | X | X | O | O |
| 25 | J | X | O | O | O | X | O |
| 26 | K | O | X | O | O | X | O |
| 27 | L | X | X | O | O | X | O |
| 28 | M | O | O | X | O | X | O |
| 29 | N | X | O | X | O | X | O |
| 30 | O | O | X | X | O | X | O |
| 31 | P | X | X | X | O | X | O |
| 32 | Q | O | O | O | X | X | O |
| 33 | R | X | O | O | X | X | O |
| 34 | ✝ | O | X | O | X | X | O |
| 35 | $ | X | X | O | X | X | O |
| 36 | ✲ | O | O | X | X | X | O |
| 37 | / | X | O | O | O | O | X |
| 38 | S | O | X | O | O | O | X |
| 39 | T | X | X | O | O | O | X |
| 40 | U | O | O | X | O | O | X |
| 41 | V | X | O | X | O | O | X |
| 42 | W | O | X | X | O | O | X |
| 43 | X | X | X | X | O | O | X |
| 44 | Y | O | O | O | X | O | X |
| 45 | Z | X | O | O | X | O | X |
| 46 | ‡ | O | X | O | X | O | X |
| 47 | COMMA | X | X | O | X | O | X |
| 48 | % | O | O | X | X | O | X |

FIG. 6

United States Patent Office 2,993,437
Patented July 25, 1961

2,993,437
HIGH SPEED PRINTER APPARATUS
Frederick M. Demer, Johnson City, and Edward J. Grenchus, Endwell, N.Y., assignors to International Business Machines Corporation, New York, N.Y., a corporation of New York
Filed Oct. 5, 1959, Ser. No. 844,511
9 Claims. (Cl. 101—93)

This invention relates to a high speed printer apparatus and more particularly to a high speed printer apparatus embodying novel print mechanism operation and control means therefor.

Printing machines have been devised wherein printing is effected on-the-fly; i.e., printing is effected from imprint forming elements, such as engraved type members, which are in motion when an imprint is formed. In general, on-the-fly printers may comprise a print mechanism having a plurality of different type members, arranged in a predetermined sequence, means for moving the type members in said sequence relative to a print line having a plurality of print positions therealong, type member striking means operable to selectively strike the type members as they register with the various print positions of the print line, and control means for selectively operating the type member striking means at the moment of registry of any desired type member with any desired print position. One form of such printing machines to which this invention is particularly related, is described in a copending application for an improved chain printer, Serial No. 704,938, filed by F. M. Demer, R. H. Harrington, and A. T. Shalkey on December 24, 1957, and copending application for a Chain Printer Timer, Serial No. 705,678, now U.S. Patent No. 2,918,865, filed by E. R. Wooding on December 27, 1957.

As shown in the said copending applications, the type members of the printing mechanisms are arranged in a predetermined manner and attached to an endless belt, thereby forming a chain of type which is driven to move the type members in one direction at a constant rate of travel along a print line. Print hammers located at the plurality of print positions along the print line are actuated to selectively strike the moving type members. A print medium, or the like, located between the hammers and the chain of type is driven by the operation of the hammers into contact with the type members thereby forming the record imprint.

It has been discovered that high print quality is difficult to achieve in on-the-fly printers operated at high speed, particularly where a back printing technique is employed; i.e., where the paper is moved into contact with the type member. The relatively poor print quality is discovered to be at least in part attributable to poor registration and shadow printing. The former occurs when the moving type member is not struck precisely at the time it is in registry with the print position, thereby producing displaced and/or partial imprint formation. The latter effect occurs when an imprint in whole or in part, and usually with reduced density, is formed on the record strip from a type member adjacent to the one being struck.

It is a general object of this invention, therefore, to provide an improved on-the-fly printer capable of printing at high speeds with improved print quality.

It is a specific object of this invention to provide an improved on-the-fly back-printing printer apparatus in which shadow printing has been eliminated and improved registration is obtainable.

It is a further specific object of this invention to provide an improved on-the-fly printer in which the above objects are achieved without undue complication in mechanical contrivance and control circuitry.

In accordance with the practice of this invention, these and other objects are attained by providing a printer apparatus operable in accordance with a principle hereinafter referred to as subcycle print operation. This is accomplished by providing a print mechanism having a plurality of uniformly spaced type members movable relative to a print line, said type members being mutually spaced so as to be alignable only at separated print positions extending along a print line. Means is provided for moving the type members relative to the print positions, preferably at a constant rate of speed, so that a plurality of subcycle alignments are effected whereby successive adjacent print positions not having type members alignable therewith during one subcycle alignment will have print members alignable therewith in one or more subsequent subcycle alignment, depending upon the spacing ratio of the type members to the print positions. Hammer means are provided which are operable to strike members at each of the print positions. Selective operation of the hammer means is obtained by printing control means comprising a storage device operable to present data to be printed, type member tracking means operable to present data identifying the type members alignable at the various print positions and timing control means for synchronizing the presentation of said data with the advance of said type members to positions of alignment. In general, the storage device comprises a storage unit adapted to have signal representations stored in all locations thereof, corresponding with each print position. The signal representations comprise coded data of the information to be printed. Storage scanning and readout means are provided for deriving first coded electric signals from the particular storage locations in timed relation with and in the sequence in which type members become alignable along the print line. Timed concurrently with readout from storage second coded electric signals indicating what type members are alignable along the print line in the sequence in which they become alignable in any subcycle alignment are produced by character generator means adapted for that purpose. Comparison means adapted to receive the first and second coded electric signals operates to produce an electric output signal usable for selective operation of the hammer means.

In the preferred embodiment, the data to be printed is stored in a three-dimensional core storage matrix device having multiple planes such that multiple bit electric signals may be derived from each of the storage positions in the form of a binary coded system. The scanning of the cores, in readout therefrom, are under the control of a set of counter rings operable to derive electric signals by skipping through the storage locations in the sequence in which the type members are alignable with the print positions along the print line. A first ring provide gating times for the X drivers of the core device while a second ring selectively gates the output of the first ring to skip scan through the storage locations in the manner in which the type members become alignable at the separated print positions. A third ring provides core driver switching of the Y drivers to select the row being read out of storage. Sense amplifiers, a single digit storage register, regeneration latch, and inhibit drivers for writing the information back into storage are also provided in a manner well known in the art.

Also, in the preferred embodiment, character generation is provided by electronic counters driven by timed pulses generated in synchronism with the subcycle alignment of the type members. A first counter hereinafter referred to as a type position counter operates to generate signals indicating what type member at the beginning of a series of subcycles is alignable wih a predetermined print position such as print position 1. The output of the type position counter is gated to set a second counter hereinafter referred to as a character counter, adapted to generate coded electric signals representing the type members alignable at all other print positions during each subcycle and in the sequence in which they become so alignable.

Basic timing for the type counter is provided by a pulse generation means such as inductors scanning a timing track on a magnetic drum moving in synchronism with the type members. Timing control for the character counter is provided by a printer clock which also provides the basic memory cycle timing for core storage readout and ring advance, compare sampling and memory regeneration and write in. Pulse control means gates multiple pulses to the character counter as necessary to step that counter. A ring control operable in response to the printer clock timing pulses operates to initiate and control the ring operations.

The comparison of the outputs from the respective counters and readout from storage is made by a circuit of the type such that when an identity exists, an output signal will be produced which is usable to control firing of the print hammers.

The speed of the printer may be increased by overlapping the memory scanning operation character generation and comparison function with the hammer firing operation. This may be accomplished by providing a secondary storage means having a plurality of individual storage devices equal in number to the number of print positions. The storage devices may be of any suitable type capable of operating an electrostatic clutch mechanism for driving a mechanical hammer device or an electromagnetically operated hammer. The selection of the secondary storage is effected through a diode switching matrix, for example, which is preferably switched in the same sequence as memory storage scan under the control of the memory readout rings. A firing pulse is generated by firing pulse generator such as a second inductor scanning a second track on the magnetic drum.

Thus it will be appreciated that a printer has been provided which is capable of producing improved print quality at high speeds. It will be further appreciated that a printer has been provided having novel print operations affording improved printer performance.

The foregoing and other objects, feature and advantages of the invention will be apparent from the following more detailed description of a preferred embodiment of the invention as illustrated in the accompanying drawings.

FIGURES 2a and 2b show a schematic presentation of the character generation circuitry embodied in the printer apparatus.

FIGURE 6 is a code chart illustrating a type of character code usable in the character generation, core storage, and readout portions of the control system of the printer.

Figure 1A:
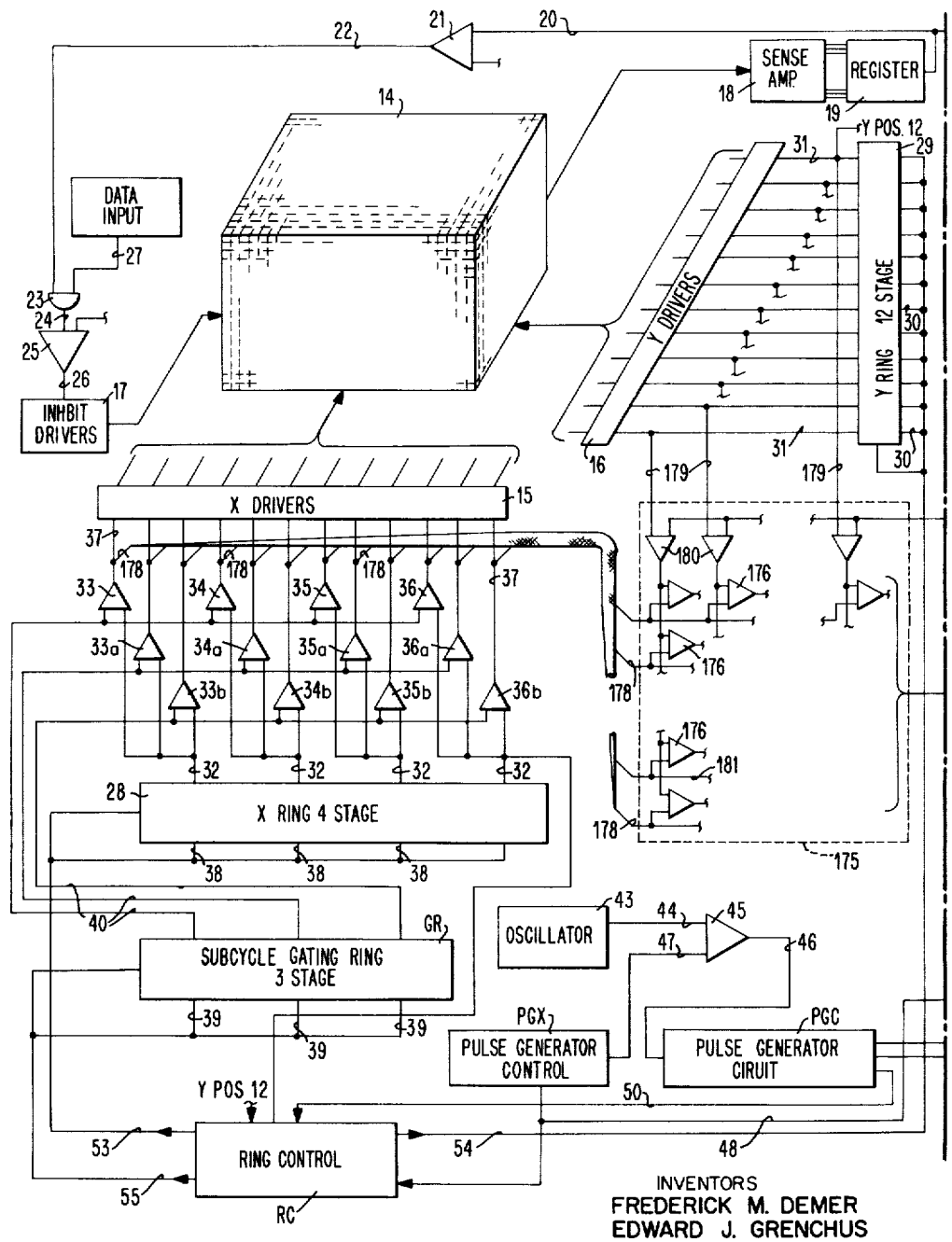
FIGURES 1a and 1b show a schematic presentation of the printer apparatus of the present invention.
Figure 1B:
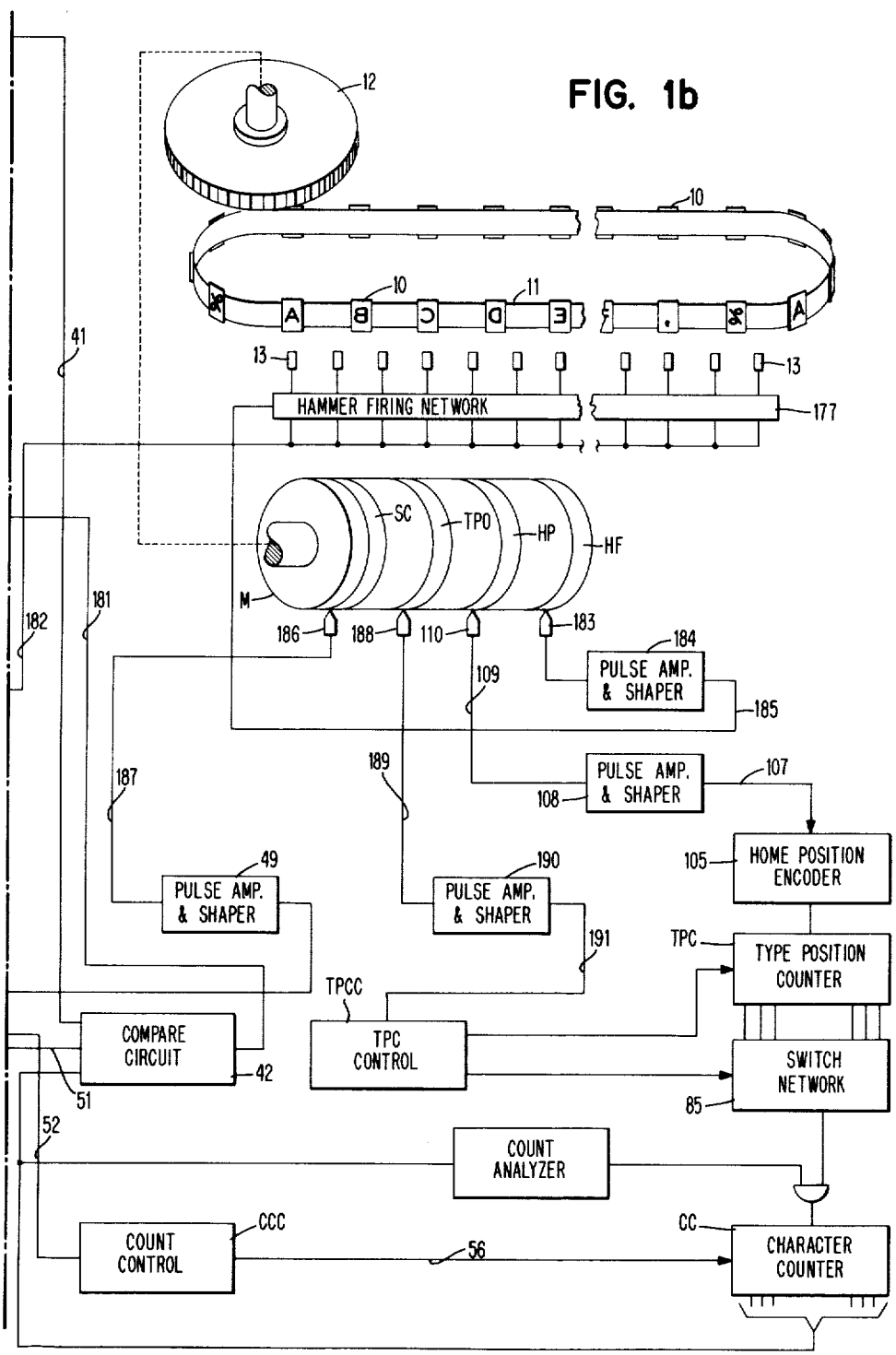

Considering the present invention in greater detail, reference is now made to FIGURES 1a and 1b where there is illustrated a print mechanism which comprises a plurality of uniformly spaced engraved type members 10 attached to a type carrier such as a continuous belt 11 thereby forming what may be referred to as a type chain.

The type members are preferably arranged in a plurality of groups, the type members in each group being different from each other, but the groups being identical in number and arrangement of type members.

In accordance with on-the-fly printing principles, the type members 10 are selectively struck while in motion. For that reason suitable drive means such as a constant speed electric motor (not shown) including drive gear 12 is provided to advance the chain of type at a constant speed in a continuous path and along a print line. A plurality of hammer devices 13 are located in any well known manner at each of a plurality of uniformly spaced print positions extending the length of the print line. The hammer means 13 may be of any well known construction which will enable each hammer device to be independently operable. One suitable type of hammer device usable in the printer apparatus of the present invention is disclosed in a copending application for an Improved Chain Printer, Serial No. 704,938, filed by F. M. Demer, R. H. Harrington and A. T. Shalkey, on December 24, 1957. Another suitable hammer mechanism is illustrated in a copending application for a Chain Printer Timer, filed by E. R. Wooding, Serial No. 705,678 on December 27, 1957. In the former application, a plurality of independently movable hammers are operated from their respective metal bands, operable to be selectively frictionally engaged by the surface of a rotating drum of an electrostatic clutch. In the latter application, the hammer means is operable by electromagnetic devices selectively energizable to operate the individual hammers. Printing from the type members 10 is obtained by striking a record strip and ink ribbon (not shown to simplify the description) against select type members 10 at any and all positions along the print line. For that purpose, a record strip and ink ribbon of any suitable type can be interposed and fed between the array of hammer devices 13 and the chain of type in any suitable manner where the record strip travels, when fed, at right angles to the direction of motion of the type members.

As already mentioned, the printer apparatus for the present invention is operable on a subcycle basis. This principle of operation is obtained by spacing the type members 10 such that only certain separated print positions along the print line will have type members alignable therewith at any one time. By advancing the chain of type along the print line, the intermediate print positions will subsequently have other type members aligned therewith. Under the control of storage device and counter devices to be more fully described hereinafter, printing occurs by selectively striking the type members alignable at any of the positions in the subcycle alignment sequence. Printing at intermediate print positions cannot occur until subsequent subcycles occur as in the type members are continuously advanced. The number of subcycles necessary for aligning a different type member once with every print position will depend on the spacing ratio between the type members 10 and the adjacent print positions. For the purpose of more fully describing the present invention with particularity, it will be assumed that the type members are spaced so that three type members span four print positions. Stated another way every other type member is alignable at every third hammer position. Thus the type spacing may be said to be 1½ pitch. Assume further that the number of print positions is 144, each having a hammer means independently operable to strike type members alignable therewith. It will further be assumed that the chain of type comprises five identical groups of 48 different type members. An example of a set of type members for each of the groups may be seen by reference to FIGURE 6. With these assumptions and the further assumption that the first print position has a type member alignable therewith in the first subcycle, the print positions having type members alignable therewith along the print line are in the sequence of 1, 4, 7, 10, 13, 16, 19, 22, etc., . . . 142. For the second subcycle the sequence is 2, 5, 8, 11, 14, 17, 20, 23, etc., . . . 143. For the third subcycle the sequence is 3, 6, 9, 12, 15, 18, 21, 24, 27, etc., . . . 144. The characters alignable with the subcycle sequences of print positions may be seen by reference to the position chart shown in FIGURE 4. As there shown, assuming type member A is in print position 1 at the beginning of the first subcycle, B is between print positions 2 and 3 and type C is aligned with type position 4, etc. At the beginning of subcycle 2, type B is aligned with print position 2, C is between positions 3 and 4, D is aligned with position 5, etc. At the beginning of subcycle 3, C is aligned with position 3, B is between 1 and 2, D is between positions 4 and 5, E is aligned with position 6, etc. At subcycle 4, B is now advanced into alignment at position 1, C is between positions 2 and 3, D is aligned with positions 4, etc. Subcycles are repeated the same manner until one set of type members has been aligned with every print position. It takes three subcycles to complete a print cycle and 144 subcycles to complete a line of print with 48 different type characters arranged in successive groups along a print line.

It will be observed that with the assumed 1½ pitch and following through all the subcycles, that the first character alignment in the first three subcycle alignment sequences follows the pattern A, B, C; B, C, D; C, D, E. The second three subcycle sequences would be B, C, D; C,D,E; and D, E, F. Of course, as each first character becomes alignable every other character is alignable along the separated print positions of a print line. It will be observed that at the beginning of each print cycle (i.e., at the beginning of every fourth subcycle) the pattern of alignment steps back to the preceding subcycle sequence followed by two successive advances in the sequence character counting. The control means for presenting data in accordance with the above-mentioned sequences will be more fully described hereinafter.

In general the printing control for a subcycle print operation comprises first means for presenting data identifying the intelligence to be printed during each subcycle, means for presenting data identifying the type members 10 alignable during a subcycle, and timing control means operable to synchronize the presentation of the respective data with the advance of the type members 10 to the subcycle print positions with which they become alignable during a subcycle.

*Core storage and readout*

Referring again to FIGURES 1a and 1b, the means for presenting data identifying the intelligence to be printed takes the form of a storage device such as a core storage matrix 14 having a plurality of storage positions corresponding in number at least to the number of print positions along a print line. The core storage matrix 14 comprises a multiple plane three dimensional array of a plurality of bistable magnetic core elements capable of having their conditions of stability selectively switched in accordance with current supplied to X, Y and inhibit windings inductively related to the core elements, the change in magnetic state of the cores being detected by sense windings provided on the core elements for that purpose. Means for applying current selectively to the windings takes the form of X drivers 15, Y drivers 16 and inhibit drivers 17 suitably connected to the X, Y and inhibit windings, respectively. The sense windings are connected to sense amplifiers 18 whose output is in turn connected to a single character register device 19. The latter may be any well known register device having a plurality of triggers or latches arranged to store a multiple bit electric signal and to generate the same through lead 20 when pulsed.

In the preferred embodiment the storage device is regenerative, i.e., the readout condition occurring, the information is put back into storage. For this purpose a feedback or regeneration circuit is provided comprising a lead 20 connecting the output of register device 19 to an AND gate 21 which in turn is connected by lead 22 to an OR circuit 23 having an output connection 24 to a second AND gate 25 connected by lead 26 to the inhibit drivers 17. A second input 27 to OR circuit 23 may be utilized for connection to data input means for writing into memory. A sample pulse applied at suitable times to the AND gate 21 will send on the coded information to the inhibit drivers 17 which puts it back into the storage location from which the readout originally was obtained. Various regeneration apparatus may be employed by persons skilled in the art for the purpose of the present invention.

Readout from core matrix 14 is effected by selective energization of the various X and Y windings threaded through the cores of the matrix. In accordance with the operation of this invention, the selective readout is performed on a subcycle basis. Since as previously explained the various type members 10 are alignable only at spaced apart print positions, it is advantageous for the purpose of this invention to read out from storage by skipping storage positions in the sequence in which the type members 10 are alignable at the respective separated print positions during each subcycle.

The means for obtaining subcycle readout operation comprises X ring 28, subcycle gating ring GR and Y ring 29. Each of the readout rings 28, 29 and GR is a multiple stage ring comprised of a plurality of binary elements such as triggers or latches, the number of stages being selected according to the number of rows and columns of cores which are to be switched to effect readout for a complete line of print matter. In the particular embodiment illustrated herein, the core matrix comprises 144 storage positions formed of 12 X and 12 Y windings having 12 X drivers and 12 Y drivers, respectively. Thus the Y ring 29 is suitably a 12 stage ring comprising 12 binary trigger elements having suitable input leads 30 for each stage. Trigger output leads 31 connect each stage to a corresponding Y driver. Each binary element forming the stages of the Y ring 29 are of any suitable type operable to switch alternately to on and off conditions upon being successively pulsed. In addition each binary element is connected to the next adjacent binary element so that switching of one stage from on to off turns the next stage on. Thus each of the stages of the X ring 28 is successively switched until the last stage is turned on. To permit recycling the Y ring 29 is close connected thereby causing stage 1 to be switched when a step pulse is received to switch the last stage off.

As already stated, subcycle readout is effected in a skip manner. For that reason, the X ring 28 is a four stage ring having input leads 38 to each stage and having the output of each stage of which is connected by leads 32 to four groups of three AND switches 33, 33a, 33b; 34, 34a, 34b; 35, 35a, 35B; and 36, 36a, 36b, each AND switch having output leads 37 connected to a corresponding X driver 15. The X ring 28 is open-ended so that it must receive a set pulse to initiate recycling. The selection of which X drivers 15 are to be energized during a subcycle is the function of the subcycle gating ring GR. Thus subcycle gating ring GR is a three stage ring open connected and stepped by pulses applied to input leads 39 and having stage output leads 40 connected to three horizontal groupings of four AND switches 33, 34, 35, 36; 33a, 34a, 35a, 36a; and 33b, 34b, 35b, 36b.

With this ring arrangement readout of every storage position will be effected at the end of three successive subcycles. The particular subcycle positions being read out is controlled by subcycle gating ring GR in the following manner. When ring GR is in stage 1, the AND switches 33, 34, 35 and 36 are switched as X ring 28 cycles through its four stages. During each interval when X ring 28 is in each of its four stages, the Y ring 29 will cycle through its twelve stages. Thus each subcycle will have 48 positions of core matrix 14 read out. The process is repeated when ring GR is in stage 2 and AND switches 33a, 34a, 35a and 36a being switched and again in stage 3 when AND switches 33b, 34b, 35b and 36b are switched. At the end of the third subcycle, every position will have been read out once in the following sequence:

Subcycle 1, storage positions _____ 1, 4, 7, 10 . . . 142
Subcycle 2, storage positions _____ 2, 5, 8, 11 . . . 143
Subcycle 3, storage positions _____ 3, 6, 9, 12 . . . 144

The process will be repeated until all 48 type members are presented to each print position. Thus a complete line of information in core matrix 14 will be read out 48 times in 144 subcycles.

It is understood, of course, that as each storage location of core matrix 14 is read out, a single multiple bit digit is being amplified by sense amplifiers 18 and stored in register device 19. The output from the register device 19 is also connected by lead 41 to a compare circuit 42. Thus core readout is serial by digit parallel by bit.

The basic timing pulses for the cycling of the rings as just described is provided by a free running oscillator 43 whose output is connected by lead 44 to AND gate 45 having an output connection 46 to a pulse generator circuit PGC. A pulse generator control PGX is connected to the second input 47 of the AND gate 45 and functions when pulsed through connection 48 by an output from a subcycle pulse amplifier and shaper 49 to gate the timing pulses each subcycle for cycling the core readout rings. Pulses gated through AND circuit 45 are carried by connection 46 to a pulse generator circuit PGC which delivers various timing pulses by leads 50, 51 and 52, respectively, to the ring control RC, compare circuit 42, and the character count control circuit CCC. The ring control RC, hereinafter more fully described, distributes pulses by connections 53, 54 and 55 to the X, Y and GR rings, respectively.

*Character generation*

As previously stated concurrently with data presentation from the core matrix 14 to the compare circuit 42 data representations of the type members 10 alignable during the subcycles are also being presented to the compare circuit 42. The subcycle type member data representations are generated basically by a character counter CC which is a six element counter device adapted to be stepped along by successive pulses to generate a six bit binary code in accordance with the format illustrated in FIGURE 6.

To attain concurrency between core readout and character generation the stepping pulses to the character counter are provided from the pulse generator circuit PGC. Since the type members 10 are alignable during any subcycle such that every other type member is alignable at every third hammer position, it becomes necessary for the character counter CC to skip count. For that reason the output of PGC is connected by lead 52 to a character counter count control CCC which is connected by lead 56 to the input of the character counter CC. The character counter count control is adapted to deliver two pulses, step 1 and step 2, to the character counter CC for each reference to a core matrix position. Thus the character counter will skip count.

Since, in the preferred embodiment, there are 144 print positions and 5 groups of 48 different type members 10, it is readily apparent that the character counter CC must make more than one complete count through the alphabet each subcycle. Referring to type member position chart of FIGURE 4 it will be seen that at the end of the first subcycle, the last character counted is comma (,) but the first character of the second subcycle is B. To start at character B in second subcycle, character counter CC must be advanced three steps. A similar requirement is found in the second subcycle. The character counter count control CCC is adapted to add a third pulse after the last count of the subcycle.

Figure 2B:
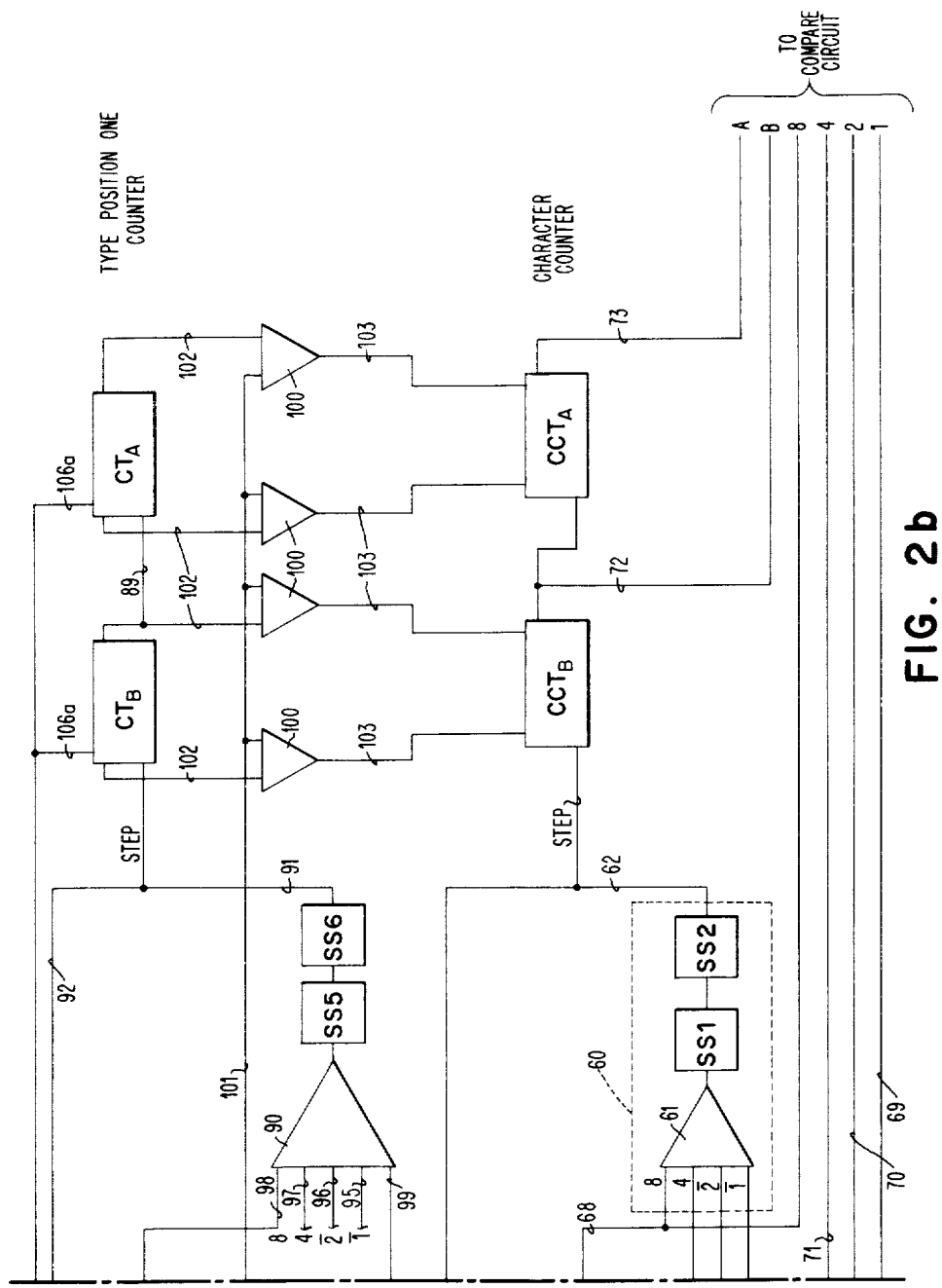
Figure 3A:
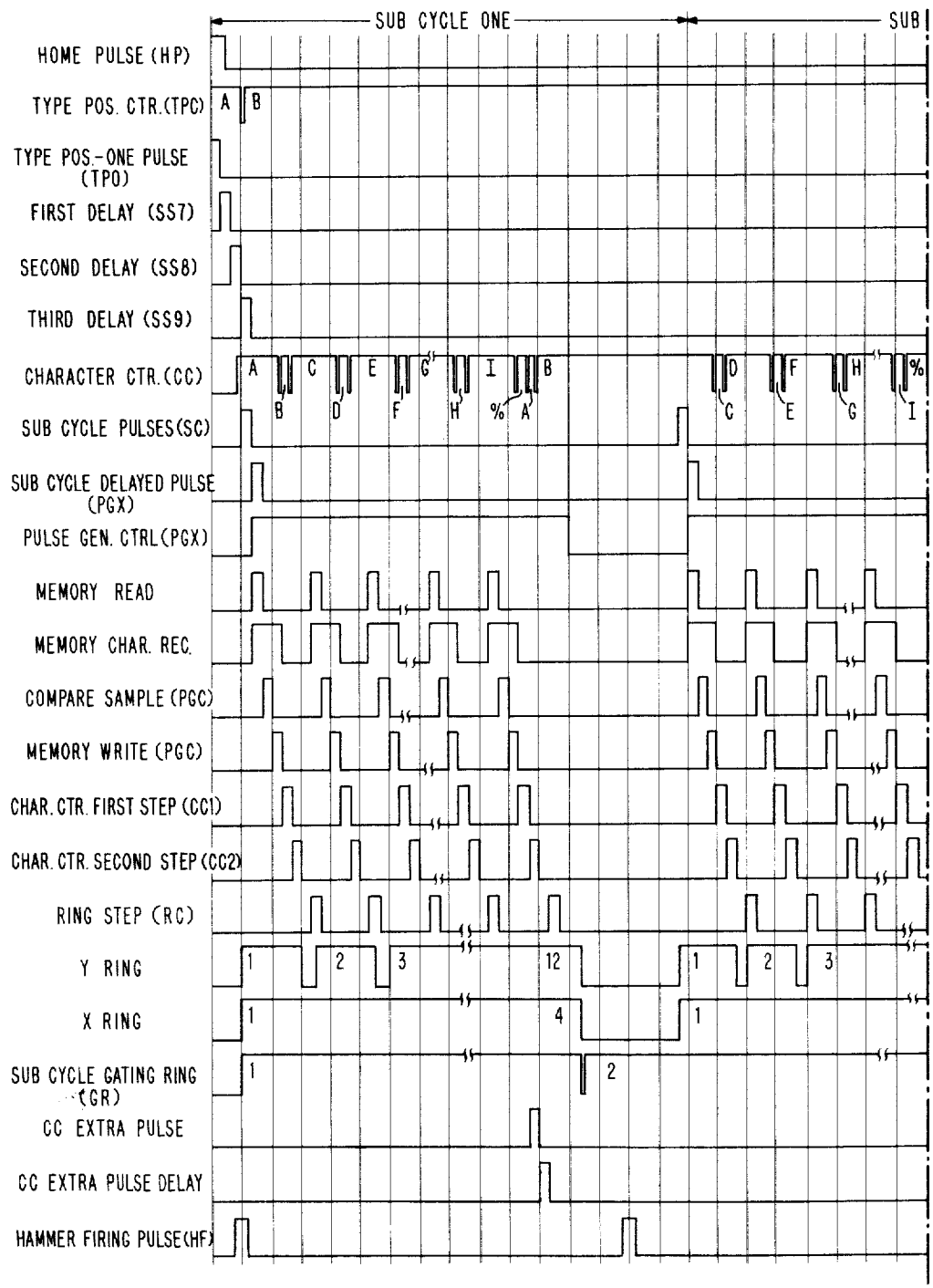
FIGURES 3a and 3b show a detailed timing chart showing the timing relationship of the various elements of the control circuitry.
Figure 3B:
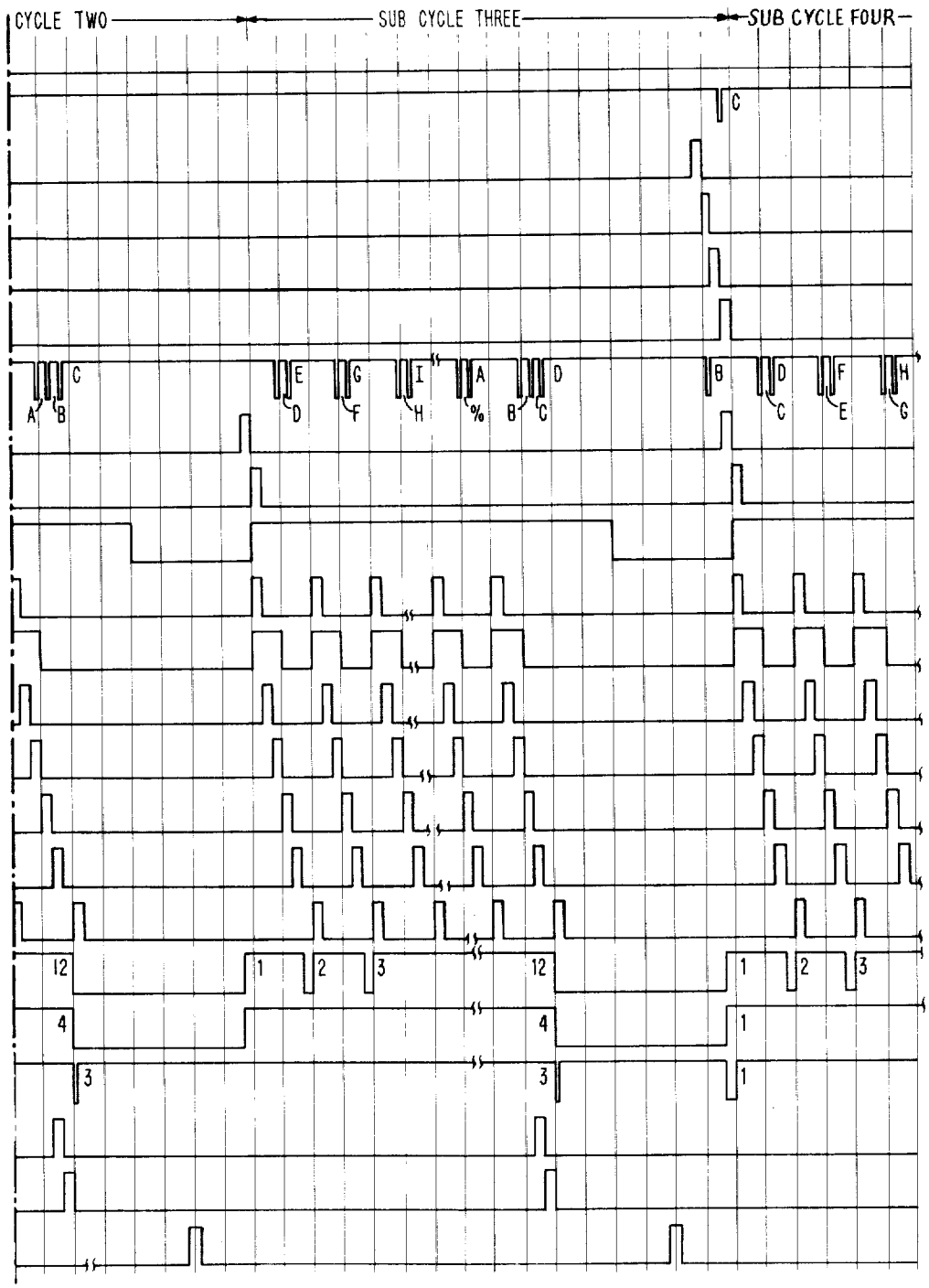

The details whereby this count process is obtained may be understood by reference to FIGURES 2a and 2b. A six bit character counter comprising six bistable trigger elements $CCT_1$, $CCT_2$, $CCT_4$, $CCT_8$, $CCT_B$, and $CCT_A$ are connected in binary fashion, in a manner well known in the art, such that successive pulses to $CCT_1$ will result in switching it and the other triggers to provide binary coded electric signals. For purpose of description it will be assumed that the left side of each trigger is the OFF side and the right side is the ON side. In accordance with the well known convention, triggers $CCT_1$, $CCT_2$, $CCT_4$ and $CCT_8$ are considered the numeric portion while $CCT_B$ and $CCT_A$ comprise the zone portion of the counter. The outputs of the ON side of the numeric triggers are connected in series to the input of the OFF side of the adjacent trigger. Thus lead 57 connects the output ON side of $CCT_1$ with input, OFF side of $CCT_2$. Similarly lead 58 connects $CCT_2$ with $CCT_4$ and lead 59 connects $CCT_4$ with $CCT_8$.

Since in the present embodiment the binary code format of FIGURE 6 is adopted, the numeric portion of character counter CC never counts beyond the binary count of twelve. Thus it becomes necessary when the character counter reaches count 12 in the numeric portion to reset the counter to the binary 1 count and control the switching of the zone triggers. For this purpose a count analyzer and reset circuit 60 is provided which comprises a four input analyzer AND gate 61 connected to successive single shots 551 and 552. A lead 62 from the output of single shot 552 is connected to the input OFF side of $CCT_B$ and to a bank of OR circuits 63 connected by leads 64 to the output ON side of the numeric triggers. For detecting the existence of a binary twelve count, the analyzer AND gate 61 is connected by leads 65, 66, 67 and 68 to output OFF side of $CCT_1$ ($\bar{1}$), output OFF side of $CCT_2$ ($\bar{2}$), the output ON side of $CCT_4$ (4) and the output ON side of $CCT_8$ (8). Leads 68, 69, 70, 71, 72 and 73 provide connection of the outputs of the ON sides of each of the triggers, zone and numeric, to the compare circuit 42.

The character counter count control CCC comprises a circuit adapted to apply two pulses, step pulse 1 and step pulse 2, to character counter CC concurrently with each reference to memory and three pulses (step pulse 1 and step pulse 2 plus a third pulse) at the end of the last count of the first and second subcycle of each print cycle. The CCC circuit comprises an OR circuit 74 having an output connected by leads 75 to the input OFF side of the trigger $CCT_1$. A first and second inputs 76 and 77 to the OR circuit 74 apply step pulses 1 and 2 from the character counter control CCC. A third input 78 to OR circuit 74 receives a third pulse from a pair of single shots SS3 and SS4 connected in series with the output of a third input to input AND gate 79. The inputs 80, 81 and 82 of the AND gate 79 are connected to gate the second pulse of the last count of each subcycle when inputs 80 and 81 receive pulses from X ring position 4 and Y ring position 12.

Figures 4, 5:
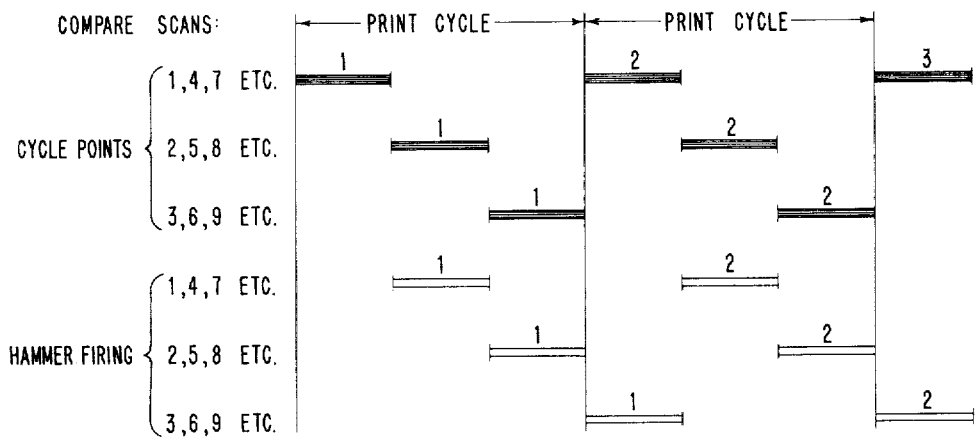
FIGURE 4 is a type member position chart showing the subcycle alignment sequences of the type members and print positions in one embodiment of the invention adopting the type member convention of FIGURE 6.
FIGURE 5 is a timing chart of the printer operation illustrating the overall aspects of subcycle operation as well as the principle of overlapping functions.

Referring again to the type position chart of FIGURE 4 it will be observed that the first print position has a type member alignable therewith every third subcycle. For example, character A aligns with print position 1 in subcycle 1 while character B aligns with the same position in subcycle 4, etc. It will be observed also that in order for the character counter CC to generate the character representations of subcycle 4 it must revert to the sequence counting of subcycle 2. In other words, if character counter CC were to count at the end of subcycle 3 in the manner in which it counted at the end of subcycles 1 and 2, character counter CC would start counting at character D instead of B. Hence means is provided to set character counter CC to the position of the count at the beginning of subcycle 2.

While various means for obtaining a subtract operation in a binary counter may be provided, in the preferred form, there is provided a second binary counter hereinafter referred to as the type 1 position character counter TPC the output of which is connected to a transfer switch network 85 to the character counter CC under the control of a type position 1 control network TPCC. Counter TPC like character control CC is a six element binary counter adapted to produce a six bit coded output and to count in the sequence set out in the format of FIG. 6. Like character counter CC counter TPC comprises four numeric binary triggers $CT_1$, $CT_2$, $CT_4$ and $CT_8$ and two zone binary triggers $CT_B$ and $CT_A$. The numeric triggers are connected as follows: lead 86 connects output ON side of $CT_1$ to input OFF side of $CT_2$. Lead 87 connects output ON side of $CT_2$ to the input OFF side of $CT_4$. Lead 88 connects the output ON side of $CT_4$ to the input OFF side of $CT_8$. Lead 89 connects the output ON side of trigger $CT_B$ to input OFF side of trigger $CT_A$.

As in the case of the character counter CC, the numeric portion of counter TPC never exceeds a binary count of twelve. A count analyzer and reset network is provided as part of the control network TPCC which includes a five input analyzer AND gate 90 and two single shots 555 and 556. The output of single shot 556 is connected by lead 91 to the input of the OFF side of triggers $CT_B$ and by lead 92 to a bank of OR circuits 93 connected by leads 94 to the output OFF side of $CT_1$ and the output ON sides of the triggers $CT_2$, $CT_4$ and $CT_8$. For detecting the existence of a binary 12 count, the analyzer AND gate 90 is connected by leads 95, 96, 97 and 98 to the output OFF side of trigger $CT_1$ ($\overline{1}$), the output OFF side of trigger $CT_2$ ($\overline{2}$), the output ON side of the trigger $CT_4$ (4) and the output ON side of the trigger $CT_8$ (8).

Also included in the control network TPCC are three single shots, 557, 558 and 559, which operate to provide successive delay pulses to reset counter TPC when it has reached the binary count of 12, to step counter TPC to the successive binary count at the beginning of each subcycle, and to pulse the transfer switch network 85 to effect a transfer of the binary count of counter TPC to character counter CC.

The fifth input of the analyzer AND gate 90 is connected by lead 99 to the output of single shot 557.

A transfer switch network preferably comprises a bank of twelve AND gates 100, two for each trigger of the respective counters TPC and CC. One input of each AND gate 100 is connected by a common lead 101 to the output of single shot 558. The other inputs of each pair of AND gates are connected by leads 102 to the opposite output sides of each trigger. The outputs of the AND gates 100 are connected to the outputs on opposite sides of the triggers of counter CC either directly by leads 103 or through leads 104 to the inputs of the bank of OR circuits 63 which connect into the numeric triggers of counter CC.

In order to assure that the count generation starts at the proper binary count as the corresponding characters are advanced toward positions of alignment, type position counter TPC is set to a home count condition representing a home-type member alignable at a home print position. Thus, in the illustrated embodiment, as shown in FIGURE 4, it will be assumed for convenience that character A is the home count character and that print position 1 is the home position. Thus, counter TPC is to be set to binary count representing A each time the appropriate type member 10 advances toward alignment with print position 1. Of course, it will be appreciated that, since the count of TPC is transferred to counter CC at the beginning of the subcycle in which character A is to be alignable at the print position 1, the character generation is locked in synchronously to produce character generation corresponding to but in advance of the actual spatial conditions existing between type members 10 and hammer means 13.

To set counter TPC, a home position encoder 105 (see FIGURES 1b, 2a and 2b), is provided having an output connection 106 to counter TPC, as shown more clearly in FIGURES 2a and 2b. The connection 106 may comprise a plurality of different leads 106a connected to the OR circuits 93 leading to the set output off side of the triggers $CT_1$, $CT_2$, $CT_4$ and $CT_8$ and leads 107 connecting directly to output off side of zone triggers $CT_B$ and $CT_A$. A common lead 107 connects all the leads 106a to the output of a pulse amplifier and shaper 108 which, in turn, has an input lead 109 connected to a home sense transducer 110.

*Ring control*

Figure 7:
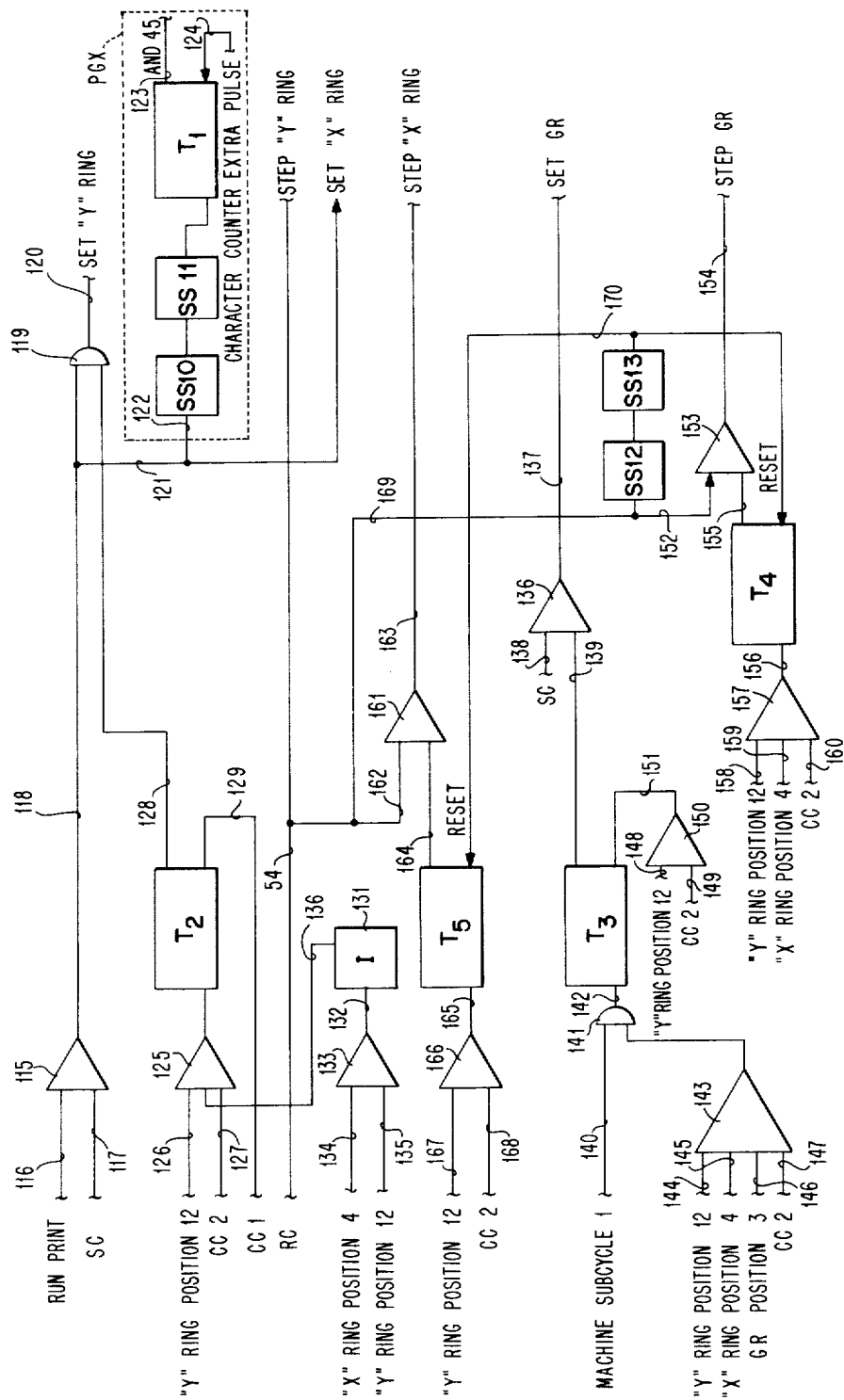
FIGURE 7 is a circuit diagram of control means for ordering the stepping of the ring circuits designed to interrogate the storage memory.

The manner in which the ring control circuit RC operates to control the setting and stepping of the XY and GR rings may be understood more fully by reference to FIGURE 7. As there shown, the setting of both the X and Y rings, 28 and 29, respectively, is conditioned in the first instance on the fact that the printer apparatus has been placed in condition to begin printing, for example after a complete line of information has been written into storage, and on the receipt of a subcycle pulse indicating that the first type member 10 of the first subcycle is advancing to a position of alignment. For these reasons the Y ring 29 set circuit preferably comprises an AND circuit 115 having a first input 116 for receiving a run print pulse and a second input 117 for receiving a subcycle pulse from magnetic timing track SC. The output of AND circuit 115 may be connected by lead 118 to an OR circuit 119 having an output lead 120 connected to the set side of the Y ring 29. The output of AND circuit 115 may be connected by lead 121 to the set of the X ring 28. Thus when a subcycle pulse is received from the timing track SC, the X and Y rings, 28 and 29, will be set to begin their respective readout cycles.

The subcycle pulses may also be used to control the gating of the oscillator 43 pulses to the various timing circuits each subcycle. To that end the pulse generator control PGC may comprise, as shown in FIGURE 7, a pair of single shots SS10 and SS11 connected by lead 122 to receive subcycle pulses from AND circuit 115. The single shots SS10 and SS11 operate to generate a pair of successive delay pulses which may be used to switch a binary trigger $T_1$. The output of the ON side of trigger $T_1$ is connected by lead 123 to the AND circuit 45 which gates pulses from the oscillator 43 to the pulse generator circuit TGC (see FIGURE 1). Trigger $T_1$ is switched OFF by the extra pulse, which is used for stepping the character counter CC at the end of the first and second subcycles as previously described, when applied to the lead 124 connected to the input ON side of trigger $T_1$.

As was previously stated, at the end of its cycle the Y ring 29 must be recycled for each stage that the X ring 28 is stepped. Since a subcycle pulse is received only once every four Y ring cycles, it becomes necessary for other means to set the Y ring 29 three times after the setting thereof by the first subcycle pulse from timing track SC at the beginning of a subcycle interval. For this purpose the Y ring 29 is made to be self-resetting and is pulsed by its own position 12 output as many times as is necessary during the subcycle. An AND circuit 125 is provided with an input 126 connectable to Y ring position 12 and a second input 127 connectable to receive the character counter second step pulse ($CC_2$). The output of the AND circuit 125 is connected to the input OFF side of a reset trigger $T_2$ whose output ON side is connected by a lead 128 to OR circuit 119. The reset trigger T₂ is turned OFF by a character counter 1 pulse (CC₁) applied to lead 129 to the input ON side of the trigger T₂. The third input to AND circuit 125 is provided for preventing a recycling of Y ring 29 at the end of the fourth Y ring cycle which is also the end of an X ring cycle. The third input 130 is connected to an inverter 131 which is connected to the output lead 132 of AND circuit 133 which has input 134 connectable to X ring position 4 and input 135 connectable to Y ring position 12. Thus when these two ring conditions occur, i.e., X ring position 4 and Y ring position 12, pulses through the inverter result in shutting off the AND circuit 125 thereby preventing the setting of the Y ring except by the next subcycle pulse.

The subcycle gating ring GR is set at the beginning of the first subcycle and must be reset at the beginning of every third subcycle. In the preferred form the first subcycle SC sets the gating ring GR and every third subcycle SC resets it to position 1 to be recycled. For this purpose a subcycle gating ring AND circuit 136 is provided which has an output 137 connectable to the first stage of the gating ring and two inputs 138 and 139. Input 138 is connected to receive a subcycle pulse from timing track SC. Input 139 is connected to the output ON side on an interlock trigger T₃.

The interlock trigger T₃ is switched ON in either of the following conditions: when the first subcycle pulse of the print line cycle is received on connection 140 leading to OR circuit 141 which has a connection 142 to the input OFF side, or when a pulse is received from AND circuit 143. Four inputs, 144, 145, 146 and 147, of AND circuit 145 are connected to be pulsed when Y ring 29 is in position 12, X ring is in position 4, gating ring GR is in position 3, and a second step pulse CC₂ for the character counter CC. The interlock trigger T₃ is switched OFF when Y ring position 12 and the step 2 pulse for the character counter CC₂ is received at inputs 148 and 149 of reset AND circuit 150 which is connected by output lead 151 to the input ON side of trigger T₃.

The stepping of the Y ring 29 is obtained by a direct connection from ring control RC by lead 54. The stepping of the gating ring GR, however, occurs once every 48 step pulses to the Y ring 29 and once every four step pulses to the X ring 28. In the preferred form, the ring step pulses applied to the Y ring 29 are applied to input 152 of AND circuit 153 which has an output connection 154 to the step lead of the gating ring GR. A second input 155 to AND circuit 153 passes a ring step pulse only when Y ring 29 is in position 12. X ring is in position 4, and step 2 pulse CC₂ is received. For that purpose the input 155 is connected to the output ON side of a trigger T₄ which is switched by a pulse ON output lead 156 from AND circuit 157 having inputs 158, 159 and 160.

The same ring step pulse produced by the ring control may be utilized to step the X ring 28. An AND circuit 161 is provided having one input 162, connected to lead 54 to receive ring step pulses and having an output connection 163 connected to the step of X ring 28. The second input 164 gates the ring step pulse to the X ring 28 if Y ring 29 is in position 12 and a second character step pulse is received. Thus input 164 is connected to receive a pulse from output ON side of a trigger T₅ which is switched ON by a pulse from a lead 165 from the AND circuit 166 having inputs 167 and 168.

The ring step pulses are also utilized to switch triggers T₄ and T₅ off. A pair of single shots, SS12 and SS13 to receive ring step pulses from lead 169 and supply delayed pulses by a common lead 170 to the input ON side of both triggers T₄ and T₅. If either of the above triggers had been switched on to effect stepping of either the X or the gating rings the delayed pulse will turn the triggers off.

Hammer selection and firing

Hammer selection is obtained from a hammer selection matrix 175 used to generate the discrete pulses equal in number to the number of hammer means 13 to be operated, i.e., 144. Hammer selection means 175 therefore in the preferred embodiment comprises a plurality of diode switching elements 176 arranged in 12 rows and 12 columns having 144 discrete outputs each connected to a separate storage element such as a thyratron device in the hammer firing network 177. A suitable thyratron storage firing control device is shown in the aforesaid application of F. M. Demer et al. which is useful in particular where an electrostatic clutch operated hammer means 13 is to be utilized. The scanning of the hammer selection matrix 175 is conducted concurrently with the scanning of the core storage matrix 14. For that reason, leads 178 are connected to the output leads 37 of the AND circuits 33 through 36b for switching the X driver 15 and leads 179 are connected to the output leads 31 for switching Y drivers 16. Each of the leads 179 connect the output leads 31 of the Y ring 29 to a separate AND circuit 180 a plurality of which are arranged in a horizontal row having second input connections through a common lead 181 which is connected to the output of the compare circuit 42. The output of AND circuits 180 are connected to each of the AND circuits 176, forming a vertical column. The leads 178 connect each lead 37 to a horizontal row of the AND circuits 176. The outputs 181 of the AND circuits 176 are connected (as shown by lead 182) to the respective storage devices in the hammer firing network 177. Concurrent pulses on any of the leads 37 and 83 will select a coincident AND circuit 176. If at the time of coincidence, pulses are also received from the compare circuit 42 on lead 181, the pulse will be gated from the selected AND circuit 176 to the appropriate hammer firing network storage position, thereby setting the hammer firing device to await a firing pulse coming from timing track HF located on magnetic drum M which is synchronously sensed at the appropriate time during the subcycle following the thyratron storage, by a transducer 183 connected to a pulse amplifier 184 and to the hammer firing circuit 185.

Synchronous pulse generation

Subcycle pulses are generated from the subcycle timing track SC which appears on the surface of magnetic drum M. Suitable means such as an electromagnetic transducer 186 senses magnetic bits located proximate the timing track SC generates pulses on a lead connection 187 to a pulse amplifier and shaper 49. The bits are located on the track SC such that a pulse is generated at the beginning of each subcycle, i.e., when a leading type member of the subcycle sequence is moving into alignment with an adjacent print position. As previously described the output of pulse amplifier and shaper 49 is connected to pulse generator control PGX and ring control RC. A second timing track TPO is provided on the surface of magnetic drum. Magnetic bits or the like contained in timing track TPO are sensed once print cycle by a transducer 188 located proximate the surface of magnetic drum M in the location of timing track TPO. Pulses generated in transducer 188 are transmitted by the lead 189 to pulse amplifier and shaper 190. The output of amplifier 190 is connected by lead 191 to the type position counter control TPCC.

Printer operation

To illustrate the operation of the printer apparatus of this invention, it will be assumed that the initiation of the printing operation is effected by an external device such as a computer or the like which operates to write data into core matrix 14 following the completion of a prior print operation and which initiates printing when the writing of data into storage is complete. In addition it will be assumed that the chain of type and the timing drum M are in motion when the called for print signal is received from the external device, having been started either by a manual or a control closing of a suitable switch for energizing the chain drive. It will be assumed that the beginning of the first subcycle in print cycle 1 will not occur until the type chain drive and the timing drum M have advanced to the point where character A is approaching home position and a home pulse HP is generated.

Upon the generation of a home pulse HP, home position encoder 105 is set to a binary A count as previously described. TPC is also set to the character A condition. Character counter CC may be in any binary count condition depending upon its last count at the end of the preceding print operation. Simultaneously with the generation of the home pulse, a type position 1 pulse from track TPO is generated into type position counter control TPCC, where single shots SS7, SS8 and SS9 produce three successive delay pulses. The first delay pulse is directed to AND circuit 90 where it samples for a binary 12 count. Since TPC has been set to an A character count which is binary count 1 by the home encoder 105, no output will be generated from AND circuit 90 and no further switching of TPC is effective at this time. The TPC is therefore ready for initiation of subcycle character generation. The second delay pulse coming from single shot SS8 operates to transfer the count of TPC through switch network 85 in a manner already described to counter CC which is thereby set for the character generation process also already described. A third delay pulse from single shot SS9 advances TPC from the binary 1 count (i.e., from A to B). Character counter CC sits in the A count condition until stepping pulses are received from an oscillator 43. Pulses from oscillator 43 are gated through AND circuit 45 by a subcycle pulse SC delivered to pulse generator PGX. But before the timing pulses are allowed to be gated through to pulse generator or circuit PGC and the ring control RC, the X, Y and GR readout rings must be set. Passing through PGX, subcycle pulse SC is time delayed. During the delay interval the first subcycle pulse SC of the machine operation is used to set the X, Y and GR rings (see FIGURE 7). At the end of the delay interval, subcycle delay pulse from single shot SS11 switches trigger T1 which gates AND circuit 45. Pulses from oscillator 43 then pass into pulse generator PGC which generates a series of timed pulses to perform the operations of stepping the rings, read out of memory write back into memory, sample compare circuit 42 and provide the basic time impulses of the character counter which are converted into two count pulses step 1 and step 2 by the character counter count control CCC.

Each of these enumerated operations occur in series sequence to comprise a memory cycle. At the completion of each memory cycle the readout rings are stepped in accordance with the sequence previously described by ring step RC. In addition to scanning memory positions of the core matrix 14 the readout rings concurrently scan through corresponding positions of hammer selection matrix 175. Thus during each reference to memory a compare sample pulse from PGC is generated and in the event of a coincidence at one of the AND circuits 176 a pulse will be sent to the secondary storage device of hammer firing network 177 corresponding to the hammer position being scanned. At the end of the forty-eighth memory cycle a subcycle will have been completed. Rings X and Y will rest in stage 4 and stage 12, respectively. Subcycle gate ring will advance to its next succeeding stage (2). At the end of the last reference to memory a CC extra pulse and a CC extra pulse delay will be generated by single shots SS3 and SS4 thereby advancing counter CC to a third position in preparation for the second subcycle. CC extra pulse also switches trigger $T_1$ off thereby close gating the AND circuit 45 thereby interrupting the transmission of pulses from oscillator 43. Thus the subcycle sequences of memory are terminated. The character counter CC at the termination of a subcycle pulsing from PGC stands in condition to begin counting the next sequence of counts (beginning with count B). Secondary storage devices in the hammer firing network 177 may be pulsed by hammer firing pulse HF. This pulse may occur at the end of the first subcycle, or may occur simultaneously at the beginning of a second subcycle memory referencing (as shown in FIGURE 5). In either case the secondary storage devices which have been conditioned to fire select hammer means 13 will fire when pulsed from timing track HF thereby selectively striking the type members alignable and called for by core matrix 14 during the preceding subcycle.

The process as described is repeated for a second and a third subcycle until all positions of core storage 14 have been scanned. In each subcycle the subcycle operations are initiated by the pulse SC directed to PGX which gates timing pulses from oscillator 43 through AND circuit 45.

At the beginning of the fourth subcycle, a type position 1 pulse TPO is converted to first, second and third delay pulses. CC is again set by SS8. It transfers the count (B) in TPC which was held from the first subcycle. Thus CC is set from D count to a B count from which position it may resume binary counting with pulses CC1 and CC2. SS9 pulse then advances TPC to the next count which will be transferred to CCC three subcycles later.

Thus 48 print cycles or 144 subcycles are run through to print a complete line of data. At the end of the print operation, control of the printer apparatus may again be assumed by an external control device or machine in preparation for subsequent printing cycles for printing a succeeding line or lines of data. During this interval such operation as print medium advance and core read in of a line of data may once again be effected.

While the invention has been particularly shown and described with reference to a preferred embodiment thereof, it will be understood by those skilled in the art that various changes in form and detail may be made therein without departing from the spirit and scope of the invention.

What is claimed is:

1. A printer apparatus comprising in combination a print mechanism including a plurality of type members movable relative to a print line having a plurality of uniformly spaced print positions, hammer means located along said print line operable for striking said type members at said print positions, said type members having a mutual spacing different from the spacing of adjacent print positions so as to be alignable with said hammer means only at separated print positions along said print line, means for advancing said type members along said print line to effect a plurality of subcycle alignment sequences at distributed separated print positions therealong, said sequences being recurrent on continued motion of said type members to effect the alignment of each character with said hammer means at every print position, storage means adapted to have data signal representations stored thereby at locations corresponding with said print positions, means for generating electric signals indicative of said type members in timed relation with the advance thereof and in the sequence in which the type members are alignable with said print positions, means for deriving data signals from said storage locations in timed relation with the advance of said type members and in the sequence in which the same are alignable with said print positions, and means operable in response to a coincidence of said generated and said derived electric signals indicative of an identity in alignable type members and data in storage for selectively operating said hammer means at print positions corresponding with said select storage locations.

2. A printer apparatus in accordance with claim 1 in which said means for generating electric signals indicative of the type members comprises a first counter means adapted to generate electric signals indicative of the first type member alignable with the first print position in each alignment sequence and a second counter means settable by said first counter means adapted for generating electric signals indicative of all the type members alignable in each of said subcycle sequences, means for deriving data signals from said storage locations in timed relation with the advance of said type members and in synchronism with the generation of said electric signals by said second counter means, means for comparing said electric signals derived from said storage locations and generated by said second counter means, means responsive to output signals from said comparison means for selecting the hammer means operable to selectively strike type members alignable during the said sequences, and means for utilizing said hammer selection signals for selectively operating said hammer means.

3. A printer apparatus comprising in combination a print mechanism including a plurality of type members movable relative to a print line having a plurality of uniformly spaced print positions, hammer means located along said print line operable for striking said type members at said print positions, said type members having a mutual spacing different from the spacing of adjacent print positions so as to be alignable in a subcycle with said hammer means only at separated print positions along said print line, means for advancing said type members relative to said print line to effect a plurality of successive subcycle alignment sequences, first means for presenting data of intelligence to be recorded and in the sequence in which said type members are alignable, second means for presenting data indicative of the type members alignable during said sequences and in timed relation with the presentation of said intelligence data, and means operable in response to an identity between said intelligence data and said type member data for selectively operating said hammer means whereby certain ones of said type members alignable during said sequences are selectively struck.

4. A printer apparatus in accordance with claim 3 in which said mutual separation between said type members is greater than the spacing of adjacent print positions.

5. A printer apparatus in accordance with claim 3 in which said mutual spacing of said type members is such that every other type member is alignable with every third print position.

6. A printer apparatus comprising in combination a print mechanism including a plurality of engraved type members movable along a print line having a plurality of uniformly spaced print positions, said type members being distributed along said print line and having a pitch greater than the spacing of adjacent print positions so as to be alignable only at separated print positions along said print line, hammer means operable for striking said type members at each of said print positions, means for advancing said type members along said print line to effect a plurality of subcycle alignments at separated print positions along said print line, said sequences being recurrent in successive manner on continued motion of said type members whereby every character is alignable in a predetermined number of subcycles with every print position, core storage means adapted to have coded electric signal representations stored thereby at locations corresponding with said print positions to have data printed thereat, means for reading out coded electric signals in a subcycle sequence in timed relation with the advance of type members and in the sequence in which said type members are alignable in said print positions, counter means for generating coded electric signals indicative of the type members in timed relation with the advance thereof and in the sequence in which the type members are alignable with said print positions in said subcycle sequence, and means for selectively operating said hammer means including compare means for comparing each of said generated electric signals with each of said readout coded electric signals.

7. A printer apparatus comprising in combination a print mechanism including a plurality of type members movable along a print line having a plurality of uniformly spaced print positions, hammer means located along said print line operable for striking said type members at said print positions, said type members having a mutual spacing greater than the spacing of adjacent print positions so as to be alignable with said hammer means only at separated print positions along said print lines, means for advancing said type members in a single direction along said print line at a constant rate of speed to effect a plurality of timed subcycle alignments at separated print positions along said print line, said sequences being recurrent in successive manner on the continued motion of said type members whereby every character is alignable in a number of subcycles with every print position, first means for presenting data of intelligence to be recorded and in the sequence in which said type members are alignable, second means for presenting data indicative of the type members alignable during said sequences and in timed relation with the presentation of said intelligence data, and means operable in response to an identity between said intelligence data and said type member data for operating select hammer means located at select print positions to selectively strike type members alignable during each said sequence.

8. A printer apparatus in accordance with claim 7 in which said mutual spacing of said type members is such that every other type member is alignable with every third print position.

9. A printer apparatus comprising in combination a print mechanism including a plurality of engraved type members movable along a print line having a plurality of uniformly spaced print positions, said type members being distributed along said print line and having a pitch greater than the spacing of adjacent print positions so as to be alignable only at separated print positions along said print line, hammer means operable for striking said type members at each of said print positions, means for advancing said type members along said print line in a single direction and at a uniform speed to effect the plurality of subcycle alignments at separated print positions along said print line, said sequences being recurrent in succession on continued motion of said type members whereby every character is alignable in a predetermined number of subcycles with every print position, core storage means adapted to have coded electric signal representations stored thereby at locations corresponding with said print positions having data printed thereat, means for reading out coded electric signals in subcycle sequence in timed relation with the advance of said type members and in the sequence in which said type members are alignable with said print positions, counter means for generating coded electric signals indicative of the type members in timed relation with the advance thereof and in the sequence in which said type members are alignable with said print positions in said subcycle sequence, means for comparing said generated electric signals with corresponding readout coded electric signals, hammer firing means having a plurality of secondary storage devices for receiving instructions to fire said hammer means, selection means operable to transmit signals generated by said comparing means to certain ones of said secondary storage means for conditioning the same in preparation for selectively operating said hammer means, means for pulsing said conditioned storage means to effect selective striking of said type members aligned in said subcycle sequence as selected.

(References on following page)

References Cited in the file of this patent

UNITED STATES PATENTS

| | | |
|---|---|---|
| 2,692,551 | Potter | Oct. 26, 1954 |
| 2,762,297 | Baer | Sept. 11, 1956 |
| 2,776,618 | Hartley | Jan. 8, 1957 |
| 2,831,424 | MacDonald | Apr. 22, 1958 |
| 2,918,865 | Wooding | Dec. 29, 1959 |
| 2,926,602 | MacDonald | Mar. 1, 1960 |